(12) United States Patent
Lee et al.

(10) Patent No.: US 11,932,164 B2
(45) Date of Patent: Mar. 19, 2024

(54) LIGHT-EMITTING CELL ARRAY, HEADLAMP DRIVING DEVICE, AND HEADLAMP CONTROL SYSTEM

(71) Applicant: SAMSUNG ELECTRONICS CO., LTD., Suwon-si (KR)

(72) Inventors: Seungwoo Lee, Hwaseong-si (KR); Gunduk Kim, Seoul (KR); Jongin Kim, Sejong-si (KR); Jongtae Kim, Hwaseong-si (KR); Jiheon Oh, Suwon-si (KR); Junho Lee, Seoul (KR); Kyuchae Cho, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/098,500

(22) Filed: Jan. 18, 2023

(65) Prior Publication Data
US 2023/0286432 A1 Sep. 14, 2023

(30) Foreign Application Priority Data
Mar. 14, 2022 (KR) ........................ 10-2022-0031648

(51) Int. Cl.
*F21S 41/663* (2018.01)
*B60Q 1/14* (2006.01)
*F21S 41/151* (2018.01)

(52) U.S. Cl.
CPC ............ *B60Q 1/143* (2013.01); *F21S 41/151* (2018.01); *F21S 41/663* (2018.01)

(58) Field of Classification Search
CPC ........ F21S 41/663; F21S 41/151; F21S 41/153
See application file for complete search history.

(56) References Cited

U.S. PATENT DOCUMENTS

| 6,372,608 | B1 | 4/2002 | Shimoda et al. |
| 6,645,830 | B2 | 11/2003 | Shimoda et al. |
| RE38,466 | E | 3/2004 | Inoue et al. |
| 6,818,465 | B2 | 11/2004 | Biwa et al. |
| 6,818,530 | B2 | 11/2004 | Shimoda et al. |
| 6,858,081 | B2 | 2/2005 | Biwa et al. |
| 6,967,353 | B2 | 11/2005 | Suzuki et al. |
| 7,002,182 | B2 | 2/2006 | Okuyama et al. |
| 7,084,420 | B2 | 8/2006 | Kim et al. |

(Continued)

FOREIGN PATENT DOCUMENTS

| JP | 5526453 B2 | 6/2014 |
| JP | 6935536 B2 | 9/2021 |
| KR | 1020210057299 A | 5/2021 |

*Primary Examiner* — Robert J May
(74) *Attorney, Agent, or Firm* — Sughrue Mion, PLLC

(57) ABSTRACT

Provided is a light-emitting cell array including a first emission region including a first light-emitting cell provided in a first direction, a second emission region including a plurality of second light-emitting cells, the plurality of second light-emitting cells being stacked on the first light-emitting cell in a second direction intersecting with the first direction and provided in the first direction, and a third emission region including a plurality of third light-emitting cells different from the plurality of second light-emitting cells, the plurality of third light-emitting cells being stacked on the plurality of second light-emitting cells in the second direction and provided in the first direction.

18 Claims, 10 Drawing Sheets

(56) References Cited

U.S. PATENT DOCUMENTS

| | | |
|---|---|---|
| 7,087,932 B2 | 8/2006 | Okuyama et al. |
| 7,154,124 B2 | 12/2006 | Han et al. |
| 7,208,725 B2 | 4/2007 | Sherrer et al. |
| 7,258,474 B2 * | 8/2007 | Valcamp ............... F21S 41/153 362/555 |
| 7,288,758 B2 | 10/2007 | Sherrer et al. |
| 7,319,044 B2 | 1/2008 | Han et al. |
| 7,501,656 B2 | 5/2009 | Han et al. |
| 7,709,857 B2 | 5/2010 | Kim et al. |
| 7,759,140 B2 | 7/2010 | Lee et al. |
| 7,781,727 B2 | 8/2010 | Sherrer et al. |
| 7,790,482 B2 | 9/2010 | Han et al. |
| 7,940,350 B2 | 5/2011 | Jeong |
| 7,959,312 B2 | 6/2011 | Yoo et al. |
| 7,964,881 B2 | 6/2011 | Choi et al. |
| 7,985,976 B2 | 7/2011 | Choi et al. |
| 7,994,525 B2 | 8/2011 | Lee et al. |
| 8,008,683 B2 | 8/2011 | Choi et al. |
| 8,013,352 B2 | 9/2011 | Lee et al. |
| 8,049,161 B2 | 11/2011 | Sherrer et al. |
| 8,129,711 B2 | 3/2012 | Kang et al. |
| 8,179,938 B2 | 5/2012 | Kim |
| 8,263,987 B2 | 9/2012 | Choi et al. |
| 8,324,646 B2 | 12/2012 | Lee et al. |
| 8,399,944 B2 | 3/2013 | Kwak et al. |
| 8,432,511 B2 | 4/2013 | Jeong |
| 8,459,832 B2 | 6/2013 | Kim |
| 8,502,242 B2 | 8/2013 | Kim |
| 8,536,604 B2 | 9/2013 | Kwak et al. |
| 8,735,931 B2 | 5/2014 | Han et al. |
| 8,766,295 B2 | 7/2014 | Kim |
| 9,739,458 B2 | 8/2017 | Miyachi et al. |
| 10,156,334 B2 | 12/2018 | Kikuchi et al. |
| 10,995,922 B2 | 5/2021 | Moellers et al. |
| 11,060,689 B2 | 7/2021 | Kwon et al. |
| 2015/0009693 A1 * | 1/2015 | Sekiguchi ............ F21S 41/663 362/465 |
| 2020/0182431 A1 | 6/2020 | Albou et al. |
| 2021/0143300 A1 | 5/2021 | Kim et al. |
| 2021/0362644 A1 * | 11/2021 | Kwon ................. H05B 47/115 |

* cited by examiner

LIGHT-EMITTING CELL ARRAY, HEADLAMP DRIVING DEVICE, AND HEADLAMP CONTROL SYSTEM

CROSS-REFERENCE TO RELATED APPLICATION

This application is based on and claims priority under 35 U.S.C. § 119 to Korean Patent Application No. 10-2022-0031648, filed on Mar. 14, 2022, in the Korean Intellectual Property Office, the disclosure of which is incorporated by reference herein in its entirety.

BACKGROUND

The present disclosure relates to an electronic device, and more particularly, to a headlamp control system including a light-emitting cell array and a headlamp driving device.

Generally, vehicles include various vehicular lamps, which have an illumination function for easily checking whether there is an object near a vehicle when driving at night and a signal function for notifying road users of a driving state of a vehicle.

Headlamps among lamps equipped in vehicles are lamps, which have a function of securing a forward view of a driver driving at night, and generally, have a function of simultaneously or separately emitting a low beam (a downward beam) onto a close distance in front of a vehicle and a high beam (or an upward beam) onto a long distance in front of a vehicle.

In terms of drivers, simultaneous emission of the low beam and the high beam may simultaneously secure fields of view of a driver for a close distance and a long distance in front of a vehicle and thus is a safest method for driving vehicles, but the high beam causes dazzling of a driver of an oncoming vehicle or an oncoming pedestrian and may create a risk where a field of view may not be secured for a time taken for light adaptation and dark adaptation.

However, a driver continuously checks opposite vehicles or pedestrians and the stability of driving a vehicle is reduced by repeating a high beam on/off operation, and due to this, the driver feels considerable inconvenience.

In order to solve such a problem, a driver assistance system for automatically controlling the turn-on/off of a high beam on the basis of the presence of an opposite vehicle and/or a preceding vehicle or controlling the emission angle and/or brightness of a low beam or a high beam has been developed and commercialized.

Recently, such technology has advanced to adaptive driving beam (ADB) technology, which senses an opposite vehicle, a preceding vehicle, and a pedestrian from a forward image with respect to a vehicle and turns off a light source or changes a lamp emission angle so that a high beam is not emitted onto where the sensed vehicle or pedestrian is located.

SUMMARY

One or more embodiments provide a headlamp control system including a light-emitting cell array and a headlamp driving device, which controls an on/off operation of each emission region to decrease manufacturing cost and the number of control circuits.

According to an aspect of an embodiment, there is provided a light-emitting cell array including a first emission region including a first light-emitting cell provided in a first direction, a second emission region including a plurality of second light-emitting cells, the plurality of second light-emitting cells being stacked on the first light-emitting cell in a second direction intersecting with the first direction and provided in the first direction, and a third emission region including a plurality of third light-emitting cells different from the plurality of second light-emitting cells, the plurality of third light-emitting cells being stacked on the plurality of second light-emitting cells in the second direction and provided in the first direction.

According to another aspect of an embodiment, there is provided a headlamp driving device including a light-emitting cell array; and an emission control module configured to control the light-emitting cell array, wherein the light-emitting cell array comprises a first emission region, a second emission region, and a third emission region, the emission control module comprises: a plurality of controllers configured to control an on/off operation of each of the first emission region, the second emission region, and the third emission region; and a plurality of drivers electrically connected to the plurality of controllers to supply a voltage to each of the first emission region, the second emission region, and the third emission region, and a size of a light-emitting cell included in the second emission region is less than a size of a light-emitting cell included in the third emission region.

According to another aspect of an embodiment, there is provided a headlamp control system including an image sensor configured to capture a forward image of a forward region in front of a vehicle of a driver; a headlamp configured to emit light onto the forward region in front of the vehicle of the driver based on an emission region set by the image sensor; and a control device configured to control the headlamp to perform an emission operation based on the forward image, wherein the headlamp comprises a first light-emitting cell, second light-emitting cells on the first light-emitting cell, and third light-emitting cells on the second-light emitting cells, wherein a size of the first light-emitting cell is greater than a size of each of the second light-emitting cells, wherein the control device comprises a plurality of drivers and a plurality of controllers, and wherein the plurality of controllers are configured to control an on operation and an off operation of the first light-emitting cell, the second light-emitting cells, and the third light-emitting cells.

BRIEF DESCRIPTION OF THE DRAWINGS

The above and/or other aspects, features, and advantages of example embodiments of the disclosure will be more apparent from the following description taken in conjunction with the accompanying drawings, in which.

DETAILED DESCRIPTION OF THE EMBODIMENTS

Hereinafter, various embodiments will be described in detail with reference to the accompanying drawings. Embodiments described herein are example embodiments, and thus, the disclosure is not limited thereto.

It will be understood that when an element or layer is referred to as being "over," "above," "on," "below," "under," "beneath," "connected to" or "coupled to" another element or layer, it can be directly over, above, on, below, under, beneath, connected or coupled to the other element or layer or intervening elements or layers may be present. In contrast, when an element is referred to as being "directly over," "directly above," "directly on," "directly below," "directly under," "directly beneath," "directly connected to" or "directly coupled to" another element or layer, there are no intervening elements or layers present.

Figure 1:
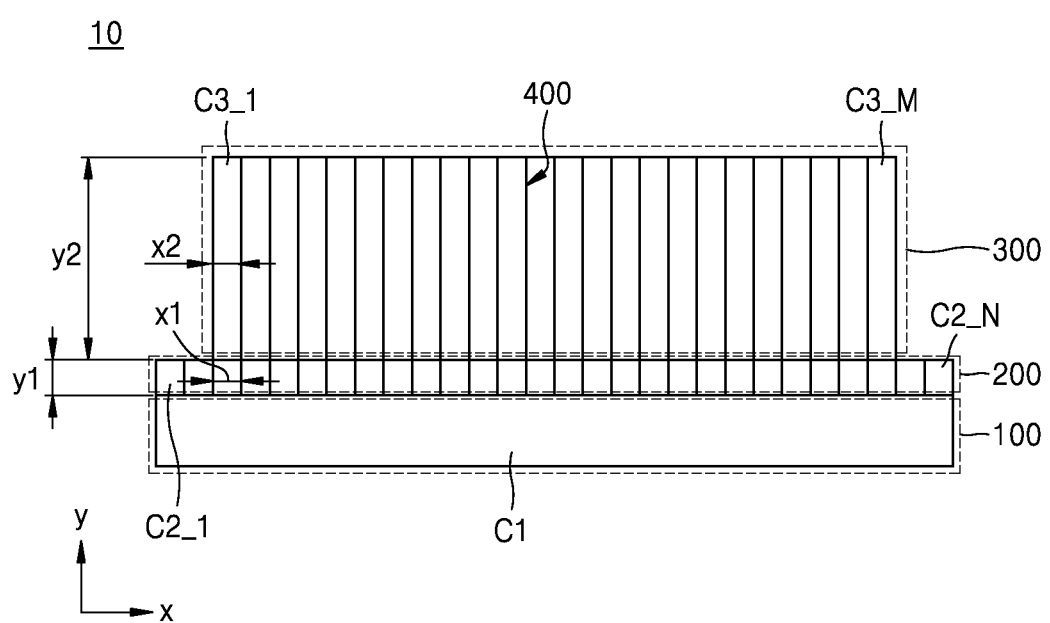
FIG. 1 is a diagram illustrating a light-emitting cell array according to an embodiment.

FIG. 1 is a diagram illustrating a light-emitting cell array 10 according to an embodiment.

Referring to FIG. 1, the light-emitting cell array 10 may include a first emission region 100, a second emission region 200, and a third emission region 300.

Here, a region may be a certain area divided from the light-emitting cell array 10. The first emission region 100, the second emission region 200, and the third emission region 300 may each have a tetragonal shape, but are not limited thereto.

The first emission region 100 may include a first light-emitting cell C1 arranged in a first direction x. The second emission region 200 may include a plurality of second light-emitting cells C2_1 to C2_N (where N is a natural number of 2 or more). For example, the second emission region 200 may be stacked on the first emission region 100 in a second direction y intersecting with the first direction x. The plurality of second light-emitting cells C2_1 to C2_N may be arranged in the first direction x. The third emission region 300 may include a plurality of third light-emitting cells C3_1 to C3_M (where M is a natural number of 2 or more). For example, the third emission region 300 may be stacked on the second emission region 200 in the second direction y. For description, the first direction x may be a direction corresponding to an x-axis direction, and the second direction y may be a direction corresponding to a y-axis direction.

In an embodiment, the size of each of the plurality of third light-emitting cells C3_1 to C3_M may be greater than that of each of the plurality of second light-emitting cells C2_1 to C2_N. For example, the size of the third light-emitting cell (for example, C3_1) may be greater than that of the second light-emitting cell (for example, C2_1). For example, a one-dimensional area of each of the plurality of third light-emitting cells C3_1 to C3_M may be greater than that of each of the plurality of second light-emitting cells C2_1 to C2_N. As another example, the volume of each of the plurality of third light-emitting cells C3_1 to C3_M may be greater than that of each of the plurality of second light-emitting cells C2_1 to C2_N.

A length y2 of each of the plurality of third light-emitting cells C3_1 to C3_M in the second direction y may be greater than a length y1 of each of the plurality of second light-emitting cells C2_1 to C2_N in the second direction y.

The length of each of the plurality of third light-emitting cells C3_1 to C3_M in the first direction x may be equal to the length of each of the plurality of second light-emitting cells C2_1 to C2_N in the first direction x.

The size of the first light-emitting cell C1 may be greater than that of each of the plurality of third light-emitting cells C3_1 to C3_M. For example, a one-dimensional area of the first light-emitting cell C1 may be greater than a one-dimensional area of each of the plurality of third light-emitting cells C3_1 to C3_M. As another example, the volume of the first light-emitting cell C1 may be greater than a volume of each of the plurality of third light-emitting cells C3_1 to C3_M. The size of the first light-emitting cell C1 may be greater than the size of each of the plurality of second light-emitting cells C2_1 to C2_N.

A partition wall 400 may be provided between each of the adjacent plurality of second light-emitting cells C2_1 to C2_N. The partition wall 400 may be provided adjacent to and surround each of the plurality of second light-emitting cells C2_1 to C2_N. The partition wall 400 may be provided between each of the plurality of third light-emitting cells C3_1 to C3_M. The partition wall 400 may be disposed in an emission region and may be disposed adjacent to and to surround each of the plurality of third light-emitting cells C3_1 to C3_M. The width of the partition wall 400 may not be constant, and a width of the partition wall 400 may be thinner or thicker for depending on a position of the partition wall.

The number of second light-emitting cells C2_1 to C2_N may be greater than the number of third light-emitting cells C3_1 to C3_M. The number of third light-emitting cells C3_1 to C3_M may be greater than the number of first light-emitting cells C1. However, the number of light-emitting cells is not limited thereto.

Figure 2:
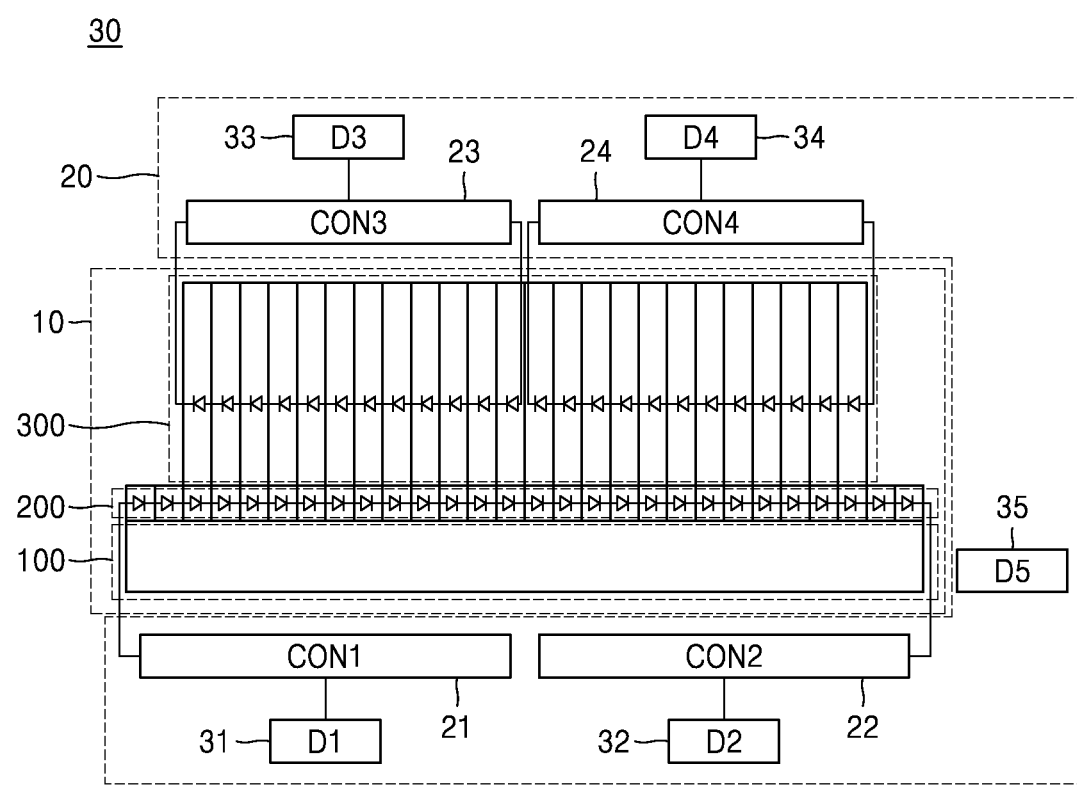
FIG. 2 is a diagram illustrating a headlamp driving device according to an embodiment.

FIG. 2 is a diagram illustrating a headlamp driving device 30 according to an embodiment.

Referring to FIG. 2, the headlamp driving device 30 may include a light-emitting cell array 10 and an emission control device 20. Description which is the same as or similar to the description of FIG. 1 is omitted.

The emission control device 20 may include a first controller 21, a second controller 22, a third controller 23, and a fourth controller 23 and may include a first driver 31, a second driver 32, a third driver 33, a fourth driver 34, and a fifth driver 35. The first to fourth controllers 21 to 24 may include at least one processor.

The first to fourth controllers 21 to 24 may control an on/off operation of each of the first emission region 100, the second emission region 200, and the third emission region 300 of the light-emitting cell array 10. In an embodiment, the first controller 21 may control an on/off operation of a first group g1 of the second emission region 200. The first group g1 may include a plurality of light-emitting cells continuously provided in the second emission region 200. The second controller 22 may control an on/off operation of a second group g2 of the second emission region 200. The second group g2 may differ from the first group g1 and may include a plurality of light-emitting cells, which are continuous. The third controller 23 may control an on/off operation of a third group g3 of the third emission region 300. The third group g3 may include a plurality of light-emitting cells continuously provided in the third emission region 300. The fourth controller 24 may control an on/off operation of a fourth group g4 of the third emission region 300. The fourth group g4 may differ from the third group g3 and may include a plurality of light-emitting cells, which are continuous.

The first to fourth drivers 31 to 34 may be electrically connected to the first to fourth controllers 21 to 24, respectively. Each of the first to fifth drivers 31 to 35 may supply a voltage to the light-emitting cell array 10. The first to fifth drivers 31 to 35 may supply a voltage to the first emission region 100, the second emission region 200, and the third emission region 300.

The first driver 31 may be electrically connected to the first controller 21. The first driver 31 may supply a voltage to the first group g1 of the second emission region 200. The second driver 32 may be electrically connected to the second controller 22. The second driver 32 may supply a voltage to the second group g2 of the second emission region 200. The third driver 33 may be electrically connected to the third controller 23. The third driver 33 may supply a voltage to the third group g3 of the third emission region 300. The fourth driver 34 may be electrically connected to the fourth controller 24. The fourth driver 34 may supply a voltage to the fourth group g4 of the third emission region 300. The fifth driver 35 may supply a voltage to the first emission region 100. The fifth driver 35 may supply the voltage to the first emission region 100 to control an on/off operation of the first emission region 100.

The first to fourth controllers 21 to 24 and the first to fourth drivers 31 to 34 may control an on/off operation of each emission region of the light-emitting cell array 10, and the fifth driver 25 may control an on/off operation of the first emission region 100. Therefore, the number of control circuits configured to control an operation of an emission region may be reduced, and thus, cost may decrease.

Figure 3:
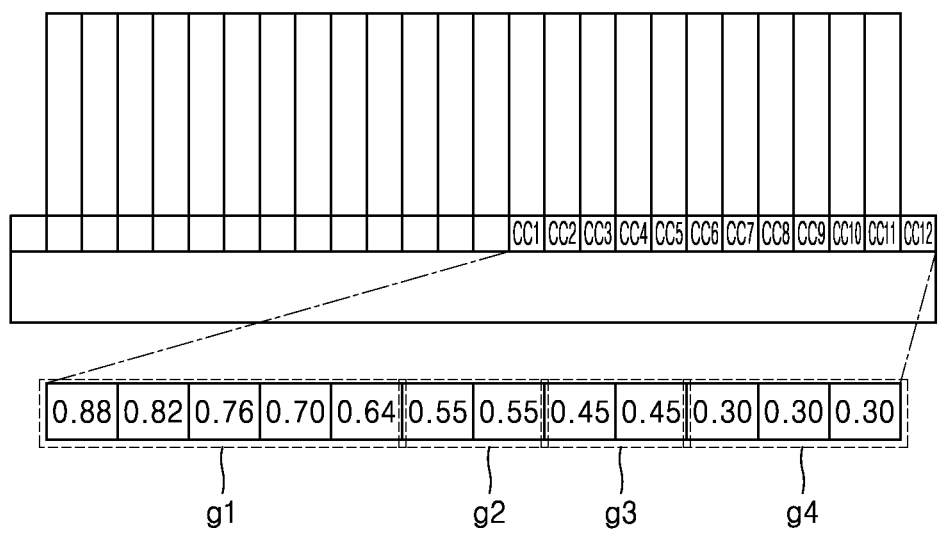
FIG. 3 is an enlarged view of a portion of the light-emitting cell array of FIG. 1.

FIG. 3 is an enlarged view of a portion of the light-emitting cell array 10 of FIG. 1.

FIG. 3 illustrates an enlarged portion of the second emission region 200 of the light-emitting cell array 10. The second emission region 200 may include a plurality of light-emitting cells C2_1 to C2_N. For example, the number of light-emitting cells C2_1 to C2_N of the second emission region 200 may be 12, but is not limited thereto.

A plurality of light-emitting cells CC1 to CC12 may include a first group g1, a second group g2, a third group g3, and a fourth group g4. The first group g1 may include five light-emitting cells CC1 to CC5. The second group g2 may include two light-emitting cells CC6 and CC7. The third group g3 may include two light-emitting cells CC8 and CC9. The fourth group g4 may include three light-emitting cells CC10 to CC12. However, embodiments are not limited thereto.

The five light-emitting cells (for example, first to fifth light-emitting cells) CC1 to CC5 of the first group g1 may have different brightness values. For example, the first light-emitting cell CC1 may have a brightness value of 0.88, the second light-emitting cell CC2 may have a brightness value of 0.82, the third light-emitting cell CC3 may have a brightness value of 0.76, the fourth light-emitting cell CC4 may have a brightness value of 0.70, and the fifth light-emitting cell CC5 may have a brightness value of 0.64. A brightness value of each light-emitting cell may be equal to or differ from one another, and brightness value may increase toward 1.

The light-emitting cells CC6 and CC7 of the second group g2 may both have a brightness value of 0.55. For example, brightness values of the light-emitting cells of the second group g2 may be equal to each other.

The light-emitting cells CC8 and CC9 of the third group g3 may both have a brightness value of 0.45. For example, brightness values of the light-emitting cells of the third group g3 may be equal to each other.

The light-emitting cells CC10 to CC12 of the fourth group g4 may all have a brightness value of 0.30. For example, brightness values of the light-emitting cells of the fourth group g4 may be equal to each other.

The first group g1 may be referred to as a center portion, and the second to fourth groups g2 to g4 may each be referred to as a peripheral portion. The first group g1 may be a center portion, and may be brighter than the second to fourth groups g2 to g4, which are peripheral portions. However, embodiments are not limited thereto, and the second to fourth groups g2 to g4, which are peripheral portions, may be relatively brighter than the first group g1, which is a center portion. As an example, the second group g2 may be brighter than the third group g3, and the third group g3 may be brighter than the fourth group g4.

Figure 4:
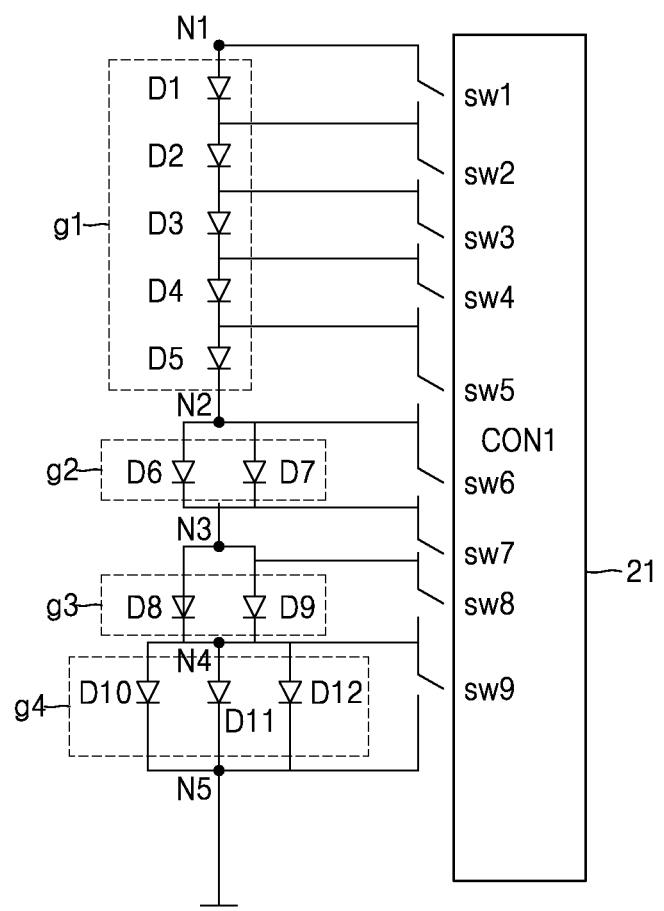
FIG. 4 is a illustrating describing a connection relationship of a portion of FIG. 3.

FIG. 4 is a diagram illustrating a connection relationship of a portion of FIG. 3. Description which is the same as or similar to the description of FIG. 3 is omitted.

Referring to FIG. 4, each of the first to fourth groups g1 to g4 may include a plurality of light-emitting devices. Each of the light-emitting devices may be implemented, for example, as a diode.

In an embodiment, the first group g1 may include a first diode D1, a second diode D2, a third diode D3, a fourth diode D4, and a fifth diode D5. The first to fifth diodes D1 to D5 may be the plurality of light-emitting cells C2_1 to C2_5 of FIG. 7. The first to fifth diodes D1 to D5 may be serially connected to one another. The first to fifth diodes D1 to D5 may be connected serially between a first node N1 and a second node N2.

In an embodiment, the second group g2 may include a sixth diode D6 and a seventh diode D7. The sixth and seventh diodes D6 and D7 may be the plurality of light-emitting cells C2_6 and C2_7 of FIG. 7. The sixth and seventh diodes D6 and D7 may be connected to each other in parallel. The sixth and seventh diodes D6 and D7 may be connected in parallel between the second node N2 and a third node N3.

In an embodiment, the third group g3 may include an eighth diode D8 and a ninth diode D9. The eighth and ninth diodes D8 and D9 may be the plurality of light-emitting cells C2_8 and C2_9 of FIG. 7. The eighth and ninth diodes D8 and D9 may be connected to each other in parallel. The eighth and ninth diodes D8 and D9 may be connected in parallel between the third node N3 and a fourth node N4.

In an embodiment, the fourth group g4 may include a tenth diode D10, an eleventh diode D11, and a twelfth diode D12. The tenth to twelfth diodes D10 to D12 may be a plurality of light-emitting cells C2_10 to C2_12 of FIG. 7. The tenth to twelfth diodes D10 to D12 may be connected to each other in parallel. The tenth to twelfth diodes D10 to D12 may be connected in parallel between the fourth node N4 and a fifth node N5.

In the embodiment described above, the number of diodes included in each group are examples, but embodiments are not limited to the illustration of FIG. 4.

Figure 5:
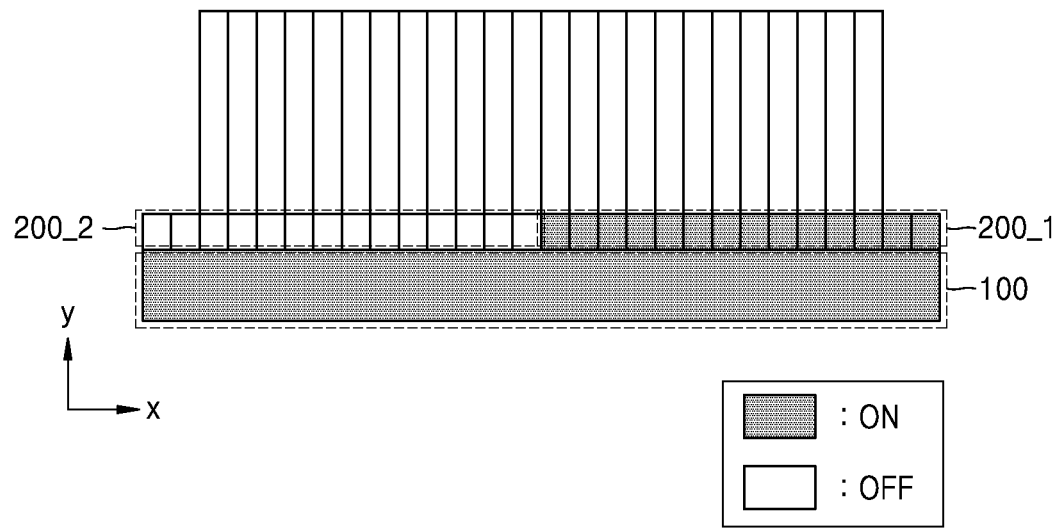
FIG. 5 is a diagram illustrating a low beam operation according to an embodiment.

FIG. 5 is a diagram illustrating a low beam operation according to an embodiment.

FIG. 5 illustrates an example in which a first emission region 100 and a first sub emission region 200_1 are turned on, and a second sub emission region 200_2 and a third emission region (for example, 300 illustrated in FIG. 1) are turned off.

As illustrated in FIG. 5, in an embodiment, when the first emission region 100 and the first sub emission region 200_1 of the second emission region 200 are turned on, a headlamp driving device may perform a low beam operation. However, embodiments are not limited thereto, and when the first emission region 100 and the second sub emission region 200_2 of the second emission region 200 are turned on, the headlamp driving device may perform the low beam operation. The first emission region 100 may be turned on with a voltage supplied from the fifth driver 35 of FIG. 2. The first sub emission region 200_1 of the second emission region 200 may be turned on with a voltage supplied from the second driver 32 of FIG. 2.

For example, forward, rearward, and lateral information about a vehicle of a driver may be analyzed, and when it is determined that a vehicle is travelling on a lane other than a lane directly adjacent to the vehicle of the driver and then changes to and drives on the lane directly adjacent to the vehicle of the driver and overtakes the vehicle of the driver, the low beam operation may be performed. When the low beam operation is performed, the first emission region 100 may be turned on, and a portion of the second emission region 200 may be turned on. Because the first emission region 100 does not include a partition wall, natural emission may be implemented by adjusting a density of a current. Therefore, because the first emission region 100 does not include a partition wall, the number of control circuits configured to control an operation of an emission region may be reduced, and thus, cost may decrease.

Figure 6:
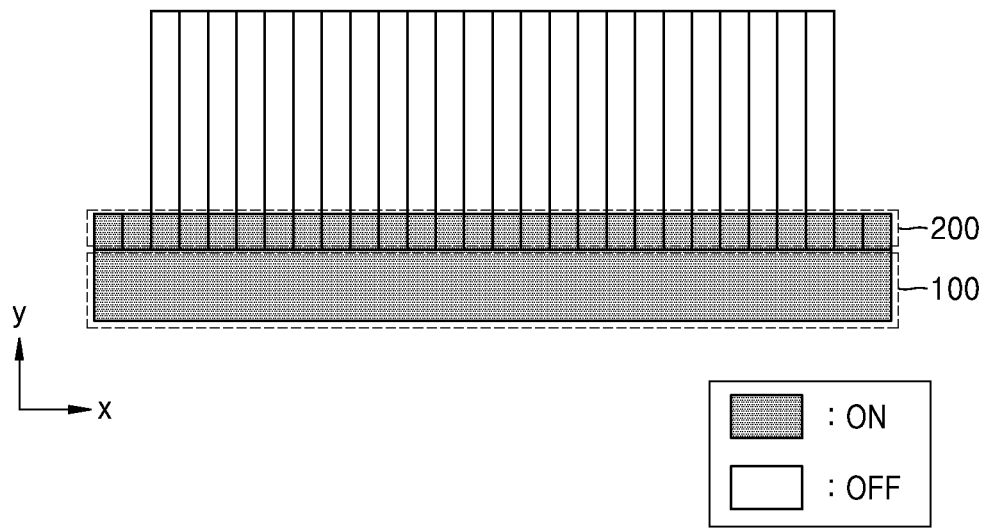
FIG. 6 is a diagram illustrating a dynamic bending light (DBL) operation according to an embodiment.

FIG. 6 is a diagram illustrating a dynamic bending light (DBL) operation according to an embodiment.

FIG. 6 illustrates an example in which a first emission region 100 is turned on, a second emission region 200 is turned on, and a third emission region (for example, 300 illustrated in FIG. 1) is turned off.

As shown in FIG. 6, in an embodiment, when both of the first emission region 100 and the second emission region 200 are turned on, the headlamp driving device may perform the DBL operation. The first emission region 100 may be turned on with a voltage supplied from the fifth driver 35 of FIG. 2. The second emission region 200 may be turned on with a voltage supplied from the first driver 31 and the second driver 32 of FIG. 6. As a detailed example, a first sub emission region 200_1 of the second emission region 200 may be turned on with a voltage supplied from the second driver 32 of FIG. 2, and the first sub emission region 200_1 of the second emission region 200 may be turned on with a voltage supplied from the first driver 31 of FIG. 2. The number of control circuits configured to control an operation performed on all or a portion of each emission region may decrease, and thus, the volume or area of the headlamp driving device may be reduced.

Figure 7:
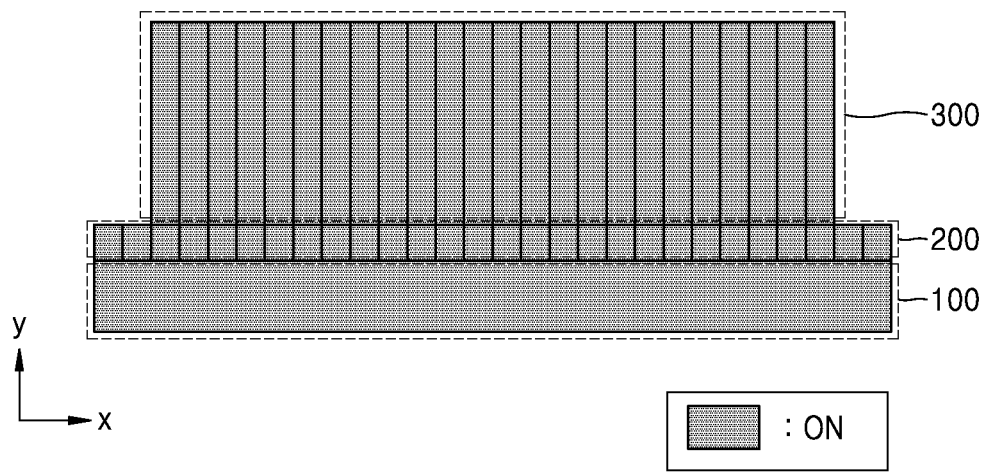
FIG. 7 is a diagram illustrating a high beam operation according to an embodiment.

FIG. 7 is a diagram illustrating a high beam operation according to an embodiment.

FIG. 7 illustrates an example in which all of the first emission region 100, the second emission region 200, and the third emission region 300 are turned on.

As in FIG. 7, in an embodiment, when all of the first emission region 100, the second emission region 200, and the third emission region 300 are turned on, the headlamp driving device may perform a high beam operation. The first emission region 100 may be turned on with a voltage supplied from the fifth driver 35 of FIG. 2. The second emission region 200 may be turned on with a voltage supplied from the first driver 31 and the second driver 32 of FIG. 6. The third emission region 300 may be turned on with a voltage supplied from the third driver 33 and the fourth driver 34 of FIG. 2. The number of control circuits configured to control an operation performed on all or a portion of each emission region may decrease, and thus, the volume or area of the headlamp driving device may be reduced.

Figure 8:
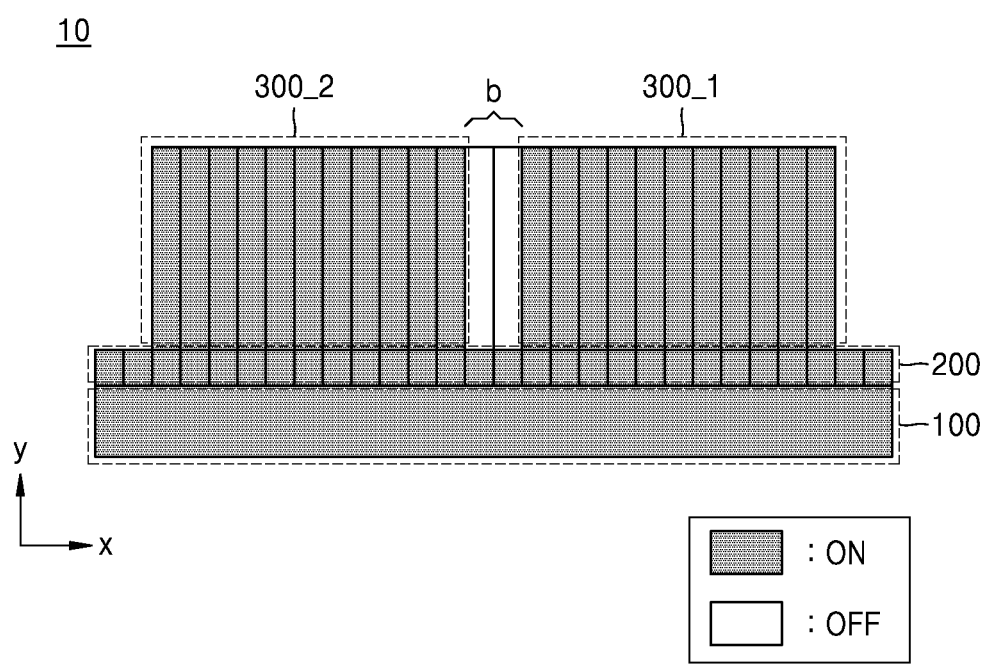
FIG. 8 is a diagram for illustrating a Glaree Free operation according to an embodiment.

FIG. 8 is a diagram illustrating a Glaree Free operation according to an embodiment.

FIG. 8 illustrates an example in which, except for only an off region b of the third emission region 300, a first emission region 100 and a second emission region 200 are turned on and on regions 300_1 and 300_2 of a third emission region 300 are turned on.

As shown in FIG. 8, in an embodiment, when the first emission region 100 and the second emission region 200 and the on regions 300_1 and 300_2 of the third emission region 300 are turned on, the headlamp driving device may perform the Glaree Free operation. The first emission region 100 may be turned on with a voltage supplied from the fifth driver 35 of FIG. 2. The second emission region 200 may be turned on with a voltage supplied from the first driver 31 and the second driver 32 of FIG. 6. The on regions 300_1 and 300_2 of the third emission region 300 may be turned on with a voltage supplied from the third driver 33 and the fourth driver 34 of FIG. 2. The number of control circuits configured to control an operation performed on all or a portion of each emission region may decrease, and thus, the volume or area of the headlamp driving device may be reduced.

Figure 9:
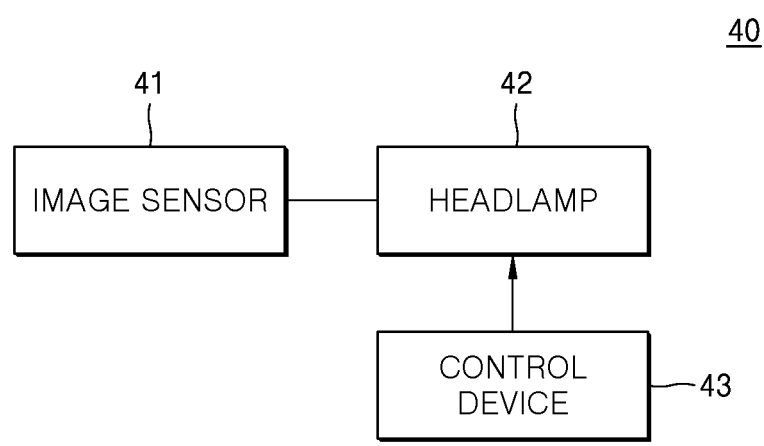
FIG. 9 is a block diagram of a headlamp control system according to an embodiment.

FIG. 9 is a block diagram of a headlamp control system 40 according to an embodiment.

Referring to FIG. 9, the headlamp control system 40 may include an image sensor 41, a headlamp 42, and a control device 43.

The image sensor 41 may include a camera and may photograph a forward region in front of a vehicle of a driver to obtain a forward image. The image sensor 41 may transfer the obtained forward image to the control device 43.

The headlamp 42 may emit light onto the forward region in front of the vehicle of the driver. The headlamp 42 may emit light based on an emission region set through the image sensor 41. The headlamp 42 may include an adaptive driving beam (ADB), which varies the illumination angle, brightness, width, and length of a lamp and emits light, or may include a high beam assistance (HBA) headlamp, which recognizes a vehicle driving on an opposite lane and automatically changes a high beam to a low beam to perform control.

The control device 43 may control an emission operation of the headlamp 42 based on the forward image obtained from the image sensor 41. The control device 43 may provide a control command to the headlamp 42. The control device 43 may include at least one processor.

Figure 10:
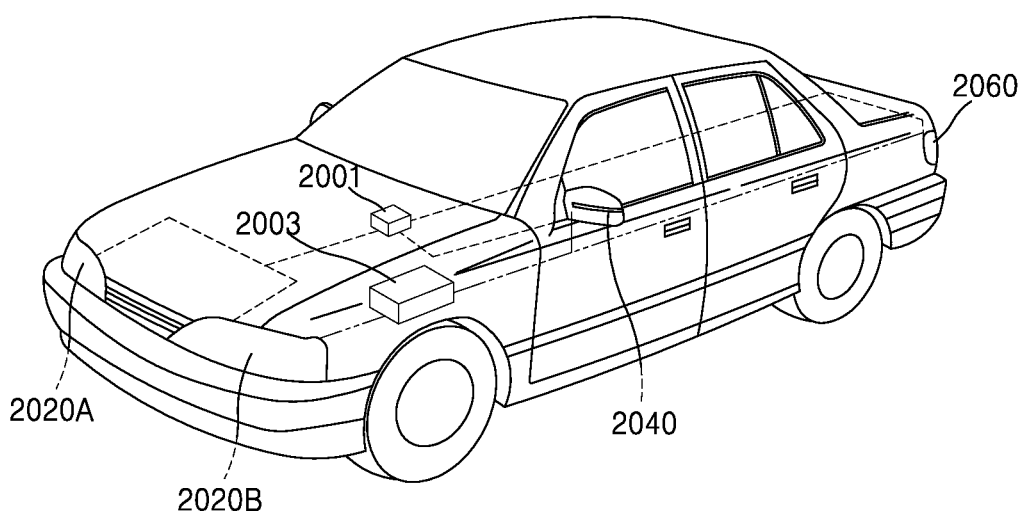
FIG. 10 is a diagram illustrating a transport means including the headlamp control system of FIG. 9.

FIG. 10 is a diagram illustrating a transport device including the headlamp control system 40 of FIG. 9.

In FIG. 10, a car is illustrated as a transport device 2000, but embodiments are not limited thereto. The transport device 2000 may include a land transport device, such as a two-wheel vehicle, a three-wheel vehicle, a car, a tracklaying vehicle, a rail, or a train, an ocean transport device, such as a ship, a boat, or a submarine, and an air transport device, such as an airplane or a helicopter, but is not limited thereto.

Referring to FIG. 10, headlamps 2020A and 2020B of the transport device 2000 may be installed, a side-view mirror lamp 2040 may be installed, and a tail lamp 2060 may be installed. At least one of the headlamp 2020, the side-view mirror lamp 2040, and the tail lamp 2060 may be a light source device including the light-emitting cell array 10 described above.

A power device 2003 embedded in the transport device 2000 may supply power to each of the headlamp 2020, the side-view mirror lamp 2040, and the tail lamp 2060. In addition, a controller 2001 embedded in the transport device 2000 may be configured to control an operation of turning on/off the headlamp 2020, the side-view mirror lamp 2040, and the tail lamp 2060. The controller 2001 may include at least one processor.

According to an embodiment, a high beam and a low beam may be implemented by using a relatively small controller, and thus, a chip size may decrease, chips may be integrated, and manufacturing cost may be reduced.

While embodiments have been described with reference to the figures, it will be understood by those of ordinary skill in the art that various changes in form and details may be made therein without departing from the spirit and scope as defined by the following claims and their equivalents.

What is claimed is:

1. A light-emitting cell array comprising:
   a first emission region comprising a first light-emitting cell arranged in a first direction;
   a second emission region comprising a plurality of second light-emitting cells, the plurality of second light-emitting cells being stacked on the first light-emitting cell in a second direction intersecting with the first direction and arranged in the first direction; and
   a third emission region comprising a plurality of third light-emitting cells different from the plurality of second light-emitting cells, the plurality of third light-emitting cells being stacked on the plurality of second light-emitting cells in the second direction and arranged in the first direction,
   wherein a size of the first light-emitting cell is greater than a size of each third light-emitting cell of the plurality of third light-emitting cells, and
   wherein a number of the plurality of second light-emitting cells is greater than a number of the plurality of third light-emitting cells.

2. The light-emitting cell array of claim 1, wherein a size of each third light-emitting cell of the plurality of third light-emitting cells is greater than a size of each second light-emitting cell of the plurality of second light-emitting cells.

3. The light-emitting cell array of claim 2, wherein a length of each third light-emitting cell of the plurality of third light-emitting cells in the second direction is greater than a length of each second light-emitting cell of the plurality of second light-emitting cells in the second direction.

4. The light-emitting cell array of claim 1, wherein the second emission region further comprises first partition walls, each first partition wall being between adjacent second light-emitting cells of the plurality of second light-emitting cells, and
   wherein the third emission region further comprises second partition walls, each second partition wall being provided between adjacent third light-emitting cells of the plurality of third light-emitting cells.

5. The light-emitting cell array of claim 1, wherein the number of the plurality of third light-emitting cells is greater than a number of first light-emitting cell.

6. A headlamp driving device comprising:
   a light-emitting cell array comprising a first emission region, a second emission region, and a third emission region; and
   an emission control device configured to control the light-emitting cell array, the emission control device comprising:
      a plurality of controllers configured to control an on operation and an off operation of each of the first emission region, the second emission region, and the third emission region; and
      a plurality of drivers electrically connected to the plurality of controllers and configured to supply a voltage to each of the first emission region, the second emission region, and the third emission region,
   wherein a size of a light-emitting cell included in the second emission region is less than a size of a light-emitting cell included in the third emission region, and
   wherein the plurality of controllers comprise:
      a first controller configured to control an on operation and an off operation of a first group of light-emitting cells of the second emission region;
      a second controller configured to control an on operation and an off operation of a second group of light-emitting cells of the second emission region, the second group being different from the first group;
      a third controller configured to control an on operation and an off operation of a third group of light-emitting cells of the third emission region; and
      a fourth controller configured to control an on operation and an off operation of a fourth group of light-emitting cells of the third emission region, the fourth group being different from the third group.

7. The headlamp driving device of claim 6,
   wherein the plurality of drivers comprise:
      a first driver connected to the first controller;
      a second driver connected to the second controller;
      a third driver connected to the third controller;
      a fourth driver connected to the fourth controller; and
      a fifth driver.

8. The headlamp driving device of claim 7, wherein the first group comprises a plurality of light-emitting cells continuously provided in the second emission region.

9. The headlamp driving device of claim 8, wherein the first group comprises:
   a first light-emitting cell group comprising a first light-emitting cell, a second light-emitting cell, a third light-emitting cell, and a fourth light-emitting cell that are connected in series; and
   a second light-emitting cell group comprising at least two light-emitting cells that are connected to one another in parallel.

10. The headlamp driving device of claim 7, wherein the third group comprises a plurality of light-emitting cells continuously provided in the third emission region.

11. The headlamp driving device of claim 10, wherein the third group comprises:
    a first light-emitting cell group comprising a first light-emitting cell, a second light-emitting cell, a third light-emitting cell, and a fourth light-emitting cell that are connected to one another in series; and
    a second light-emitting cell group comprising two or more light-emitting cells that are connected to one another in parallel.

12. The headlamp driving device of claim 7, wherein the fifth driver is configured to supply a voltage to the first emission region to control an on operation and an off operation of the first emission region.

13. The headlamp driving device of claim 7, wherein the headlamp driving device is configured to perform a first operation based on the first emission region being turned on and a portion of the second emission region being turned on.

14. The headlamp driving device of claim 7, wherein the headlamp driving device is configured to perform a second operation based on the first emission region being turned on and the second emission region being turned on.

15. The headlamp driving device of claim 7, wherein the headlamp driving device is configured to perform a third operation based on the first emission region being turned on, the second emission region being turned on, and the third emission region being turned on.

16. The headlamp driving device of claim 7, wherein the headlamp driving device is configured to perform a fourth operation based on the first emission region being turned on, the second emission region being turned on, and a portion of the third emission region being turned on.

17. A headlamp control system comprising:
  an image sensor configured to capture a forward image of a forward region in front of a vehicle of a driver;
  a headlamp configured to emit light onto the forward region in front of the vehicle of the driver based on an emission region set by the image sensor; and
  a control device configured to control the headlamp to perform an emission operation based on the forward image,
  wherein the headlamp comprises a first light-emitting cell, second light-emitting cells on the first light-emitting cell, and third light-emitting cells on the second-light emitting cells,
  wherein a size of the first light-emitting cell is greater than a size of each of the second light-emitting cells and a size of each of the third light-emitting cells,
  wherein the size of each of the third light-emitting cells are greater than a size of each of the second light-emitting cells,
  wherein a number of the second light-emitting cells is greater than a number of the third light-emitting cells,
  wherein the control device comprises a plurality of drivers and a plurality of controllers, and
  wherein the plurality of controllers are configured to control an on operation and an off operation of the first light-emitting cell, the second light-emitting cells, and the third light-emitting cells.

18. The headlamp control system of claim 17, wherein the headlamp comprises:
  first partition walls between adjacent second light-emitting cells of the second light-emitting cells; and
  second partitions wall between adjacent third light-emitting cells of the third light-emitting cells, and
  wherein a number of the second light-emitting cells is less than a number of the third light-emitting cells.

\* \* \* \* \*